United States Patent
Tan et al.

(10) Patent No.: US 8,665,210 B2
(45) Date of Patent: Mar. 4, 2014

(54) SENSING USER INPUT USING THE BODY AS AN ANTENNA

(75) Inventors: Desney S. Tan, Kirkland, WA (US); Daniel S. Morris, Bellevue, WA (US); Gabriel A. Cohn, Sammamish, WA (US); Shwetak N Patel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 555 days.

(21) Appl. No.: 12/975,373

(22) Filed: Dec. 22, 2010

(65) Prior Publication Data
US 2012/0162057 A1 Jun. 28, 2012

(51) Int. Cl.
*G09G 5/00* (2006.01)
*G06F 3/033* (2013.01)

(52) U.S. Cl.
USPC .......................................... 345/156; 715/863

(58) Field of Classification Search
USPC ............................... 345/156–184; 700/13, 83; 715/856–866; 375/346, 352
See application file for complete search history.

(56) References Cited

U.S. PATENT DOCUMENTS

| | | | |
|---|---|---|---|
| 5,793,309 A | 8/1998 | Nellson | |
| 7,570,064 B2 | 8/2009 | Roziere | |
| 7,782,299 B2* | 8/2010 | Ogino | 345/158 |
| 8,228,292 B1* | 7/2012 | Ruiz et al. | 345/156 |
| 2002/0033803 A1* | 3/2002 | Holzrichter et al. | 345/158 |
| 2005/0024325 A1* | 2/2005 | Fleischmann et al. | 345/156 |
| 2007/0040545 A1 | 2/2007 | Takiguchi | |
| 2008/0158432 A1 | 7/2008 | Hwang et al. | |
| 2009/0174675 A1* | 7/2009 | Gillespie et al. | 345/173 |
| 2009/0271004 A1* | 10/2009 | Zecchin et al. | 700/13 |
| 2010/0103918 A1 | 4/2010 | Song et al. | |
| 2011/0142100 A1* | 6/2011 | Farmer et al. | 375/148 |

FOREIGN PATENT DOCUMENTS

| | | | |
|---|---|---|---|
| JP | 2008197801 A | * | 8/2008 |
| KR | 1020040061655 A | | 7/2004 |
| KR | 1020050047329 A | | 5/2005 |
| KR | 1020070025138 A | | 3/2007 |
| KR | 1020080100608 A | | 11/2008 |

OTHER PUBLICATIONS

English Translation of JP 2008-197801.*

(Continued)

*Primary Examiner* — Hong Zhou
(74) *Attorney, Agent, or Firm* — Tom Wong; Jim Ross; Micky Minhas (57) ABSTRACT

A human input system is described herein that provides an interaction modality that utilizes the human body as an antenna to receive electromagnetic noise that exists in various environments. By observing the properties of the noise picked up by the body, the system can infer human input on and around existing surfaces and objects. Home power lines have been shown to be a relatively good transmitting antenna that creates a particularly noisy environment. The human input system leverages the body as a receiving antenna and electromagnetic noise modulation for gestural interaction. It is possible to robustly recognize touched locations on an uninstrumented home wall using no specialized sensors. The receiving device for which the human body is the antenna can be built into common, widely available electronics, such as mobile phones or other devices the user is likely to commonly carry.

20 Claims, 4 Drawing Sheets

(56) References Cited

OTHER PUBLICATIONS

Miyazaki, Yasumitsu., "Analysis of electromagnetic guided waves on curved conducting biological surface by conformal mapping method", Retrieved at << http://www.piers.org/piersproceedings/download.php?file=cGllcnMyMDEwQ2FtYnJpZGdlfDRQM18xMDkyLnBkZnwwOTEyMjEwNTE0MzU= >>, PIERS Proceedings, Jul. 5-8, 2010, pp. 1092-1096.

Stephenson, Maanna., "How the human body antenna transceives informed energies", Retrieved at << http://ezinearticles.com/?How-the-Human-Body-Antenna-Transceives-Informed-Energies&id=1816572 >>, Retrieved Date: Oct. 8, 2010, pp. 5.

Pippen, David L., "Jack's and Sam's Science fair project", Retrieved at << http://technologyinterface.nmsu.edu/summer97/electronics/scifair.html >>, 1997, pp. 9.

Fujiwara, Shizuo., "Antenna effect of human body towards electromagnetic waves in space", Retrieved at << http://www.journalarchive.jst.go.jp/jnlpdf.php?cdjournal=analsci1985&cdvol=6&noissue=1&startpage=143&lang=en&from=jnlabstract >>, Analytical Sciences, vol. 6, Feb. 1990, pp. 143-144.

Seker, et al., "Effects of electromagnetic fields on human beings and electronic devices", Retrieved at << http://www.hsz-t.ch/publikationen/fachartikel/Effects_of_Electromagnetic_Fields.pdf >>, pp. 6.

"Sensing mechanical energy to appropriate the body for data input", U.S. Appl. No. 12/630,892, filed Dec. 4, 2009, pp. 1-32.

Chen, et al., "Numerical computation of the EM coupling between a circular loop antenna and a full-scale human-body model", Retrieved at << http://ieeexplore.ieee.org/stamp/stamp.jsp?tp=&arnumber=721159 >>, IEEE Transactions on Microwave Theory and Techniques, vol. 46, No. 10, Oct. 1998, pp. 1516-1520.

Cho, et al., "A 60 kb/s-10 Mb/s adaptive frequency hopping transceiver for interference-resilient body channel communication", Retrieved at << http://ieeexplore.ieee.org/stamp/stamp.jsp?tp=&arnumber=4787575 >>, IEEE Journal of Solid-State Circuits, vol. 44, No. 3, Mar. 2009, pp. 708-717.

Chuang, et al., "Computer simulation of the human-body effects on a circular-loop-wire antenna for radio-pager communications at 152, 280, and 400 MHz", Retrieved at << http://ieeexplore.ieee.org/stamp/stamp.jsp?tp=&arnumber=618179 >>, IEEE Transactions on Vehicular Technology, vol. 46, No. 3, Aug. 1997, pp. 544-559.

Cohn, et al., "SNUPI: sensor nodes utilizing powerline infrastructure.", Retrieved at << http://sockeye.cs.washington.edu/research/pubs/Cohn_SNUPI_ubicomp10.pdf >>, The 2010 ACM Conference on Ubiquitous Computing, Sep. 26-29, 2010, pp. 10.

Dietz, et al., "DiamondTouch: a multi-user touch technology", Retrieved at << http://www.merl.com/papers/docs/TR2003-125.pdf >>, ACM Symposium on User Interface Software and Technology (UIST), Nov. 2001, pp. 11.

Fukumoto, et al., "Body coupled fingering: Wireless Wearable Keyboard", Retrieved at << http://www.sigchi.org/chi97/proceedings/paper/fkm.htm >>, ACM Conference on Human Factors & Computing Systems, Mar. 22-27, 1997, pp. 17.

Gabriel, et al., "The dielectric properties of biological tissues: I. Literature survey", Retrieved at << http://libach.inrf.uci.edu/groups/bats/uploads/Electrodes/Gabriel_PhyMedBio_1996.pdf >>, 1996, pp. 2231-2249.

Gupta, et al., "ElectriSense: single-point sensing using emi for electrical event detection and classification in the home", Retrieved at << http://www.cs.washington.edu/homes/sidhant/docs/ElectriSense.pdf >>, UbiComp, Sep. 26-29, 2010, pp. 10.

Hall, et al., "Antennas and propagation for body centric communications", Retrieved at << http://ieeexplore.ieee.org/stamp/stamp.jsp?tp=&arnumber=4584864 >>, First European Conference on Antennas and Propagation, Nov. 6-10, 2006, pp. 7.

Hall, et al., "The WEKA data mining software: An Update", Retrieved at << http://www.kdd.org/explorations/issues/11-1-2009-07/p2V11nl.pdf >>, ACM SIGKDD Explorations Newsletter, vol. 11, No. 1, Jun. 2009, pp. 10-18.

Harrison, et al., "Skinput: appropriating the body as an input surface", Retrieved at << http://research.microsoft.com/en-us/um/redmond/groups/cue/publications/HarrisonSkinputCHI2010.pdf >>, CHI Conference on Human Factors in Computing Systems, Apr. 10-15, 2010, pp. 10.

Patel, et al., "PowerLine positioning: a practical sub-room-level indoor location system for domestic use", Retrieved at << http://citeseerx.ist.psu.edu/viewdoc|download?doi=10.1.1.94.5222&rep=rep1&type=pdf >>, Ubicomp, 2006, pp. 441-458.

Saponas, et al., "Enabling always-available input with muscle-computer interfaces", Retrieved at << http://research.microsoft.com/en-us/um/redmond/groups/cue/publications/SaponasUIST2009EMG.pdf >>, Proceedings ACM Symposium on User Interface Software and Technology, Oct. 4-7, 2009, pp. 10.

Shevade, et al., "Improvements to the SMO algorithm for SVM regression", Retrieved at << http://citeseerx.ist.psu.edu/viewdoc/download?doi=10.1.1.146.375&rep=rep1&type=pdf >>, IEEE Transactions on Neural Networks, vol. 11, No. 5, Sep. 2000, pp. 1188-1193.

Smith, J. R., "Field mice: Extracting hand geometry from electric field measurements", Retrieved at << http://seattle.intel-research.net/~jrsmith/fieldmouse.pdf >>, IBM Systems Journal, vol. 35, No. 3&4, 1996, pp. 587-608.

Smola, et al., "A tutorial on support vector regression", Retrieved at << http://eprints.pascal-network.org/archive/00002057/01/SmoSch03b.pdf >>, Sep. 30, 2003, pp. 1-24.

Stuntebeck, et al., "Wideband powerline positioning for indoor localization", Retrieved at << http://abstract.cs.washington.edu/~shwetak/papers/wplp_ubi08.pdf>>, Proceedings of Ubicomp, 2008, pp. 94-103.

Zimmerman, et al., "Applying electric field sensing to human-computer interfaces", Retrieved at << http://citeseerx.ist.psu.edu/viewdoc/download?doi=10.1.1.49.9296&rep=rep1&type=pdf >>, Conference on Human Factor in Computing Systems, May 7-11, 1995, pp. 8.

Zimmerman, Thomas Guthrie., "Personal Area Networks: nearfield intrabody communication", Retrieved at << http://citeseerx.ist.psu.edu/viewdoc/download?doi=10.1.1.85.5750&rep=rep1&type=pdf >>, Jun. 26, 1995, pp. 1-81.

"International Search Report", Mailed Date: Sep. 5, 2012, Application No. PCT/US2011/065705, Filed Date: Dec. 19, 2011, pp. 9.

* cited by examiner

SENSING USER INPUT USING THE BODY AS AN ANTENNA

BACKGROUND

As computers become more mobile and ubiquitous, people increasingly expect always-available computing, either with devices that they carry on their bodies, or using devices embedded in the environment. There is an increasing need for interaction modalities that go beyond the keyboard and mouse, and furthermore, that do not require mediated interaction with specialized devices such as styluses.

Researchers have addressed this need through a variety of input channels. Speech recognition enables hands-free interaction for a variety of desktop and mobile applications. Similarly, computer vision enables machines to recognize faces, track movement, recognize gestures, and reconstruct three-dimensional (3d) scenes. Various techniques, most notably capacitive sensing, have been used to instrument surfaces such a tables, walls, and mobile devices in order to provide touch sensing. In addition, specialized depth cameras that allow users to interact with their computers using whole-body gestures have recently become commercially available to consumers (e.g., MICROSOFT™ KINECT™).

Speech input comes at a relatively low cost of instrumentation, but is limited in input bandwidth and may not be appropriate in many scenarios. Vision- and touch-based technologies offer an array of subtle, natural interaction techniques, but are limited in the potential scale of deployment due to their associated installation burden and cost. Consequently, there will likely not be homes or workplaces that allow truly ubiquitous input in the near future using these modalities.

Other researchers, realizing these limitations, have explored sensors that exploit characteristics of the human body itself to turn it into an inherently portable interaction device. Some have used bio-acoustic sensors to determine the location of taps on the body, and thereby turn it into a touchscreen. Others use electrical recordings of forearm muscles to sense muscle activity and infer finger gestures. However, these on-body input systems are to date limited to a small number of discrete inputs, and do not offer the large-scale interaction that is provided by touch-sensitive surfaces.

Touch sensing and computer vision have made human-computer interaction possible in environments where keyboards, mice, or other handheld implements are not available or desirable. However, the high cost of instrumenting environments limits the ubiquity of these technologies, particularly in home scenarios where cost constraints dominate installation decisions.

SUMMARY

A human input system is described herein that provides an interaction modality that utilizes the human body as an antenna to receive electromagnetic (EM) noise that exists in various environments. By observing the properties of the noise picked up by the body, the system can infer human input on and around existing surfaces and objects, specifically the walls and appliances in the home. Home power lines have been shown to be a relatively good transmitting antenna that creates a particularly noisy environment. The human input system leverages the body as a receiving antenna and EM noise modulation for gestural interaction. It is possible to robustly recognize touched locations on an uninstrumented home wall using no specialized sensors. The system performs robust classification of human input, such as the position of discrete touches around light switches, the particular light switch being touched, which appliances are touched, differentiation between hands, as well as continuous proximity of hand to the switch, among others. The receiving device for which the human body is the antenna can be built into common, widely available electronics, such as mobile phones or other devices the user is likely to commonly carry. Thus, the human input system allows a new way for people to interact with computing devices using their bodies as input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A human input system is described herein that provides an interaction modality that utilizes the human body as an antenna to receive electromagnetic (EM) noise that exists in various environments. Fortunately, home environments frequently offer a signal that is identifiable to locations and objects within the home: electromagnetic noise. While this noise is bothersome to nearly every other EM sensing application, the human input system treats it as a useful signal. By observing the properties of the noise picked up by the body, the system can infer gestures, location, or other input on and around existing surfaces and objects, specifically the walls and appliances in the home. Home power lines have been shown to be a relatively good transmitting antenna that creates a particularly noisy (i.e., signal-rich) environment. The human input system leverages the body as a receiving antenna and EM noise modulation for gestural interaction. It is possible to robustly recognize touched locations on an uninstrumented home wall using no specialized sensors. The system performs robust classification of human input, such as the position of discrete touches around light switches, the particular light switch being touched, which appliances are touched, differentiation between hands, as well as continuous proximity of hand to the switch, among others.

The receiving device for which the human body is the antenna can be built into common, widely available electronics, such as mobile phones or other devices the user is likely to commonly carry. In some embodiments, the system performs a setup phase to capture an initial EM picture of the environment to use as a baseline. Over time, the system may repeat the setup procedure to account for changing conditions. For example, every time someone turns on an appliance (e.g., a microwave), the EM characteristics of the home change in ways that are not intended as input by the user that the system may observe and calibrate to remove. As the user performs actions, the system observes changes in the EM signal received by the antenna. The system may include predefined profiles that describe human input likely to cause particular observed changes, or the system may perform a learning phase where the user performs a series of actions while the system measures, and associates the actions with a particular human input. For example, if the user wants to raise his arm to turn on a light, the system can measure the EM change as the user raises his arm in a learning mode, and then will recognize that EM change in the future as the user making the same gesture. Thus, the human input system allows a new way for people to interact with computing devices using their bodies as input.

Figure 1:
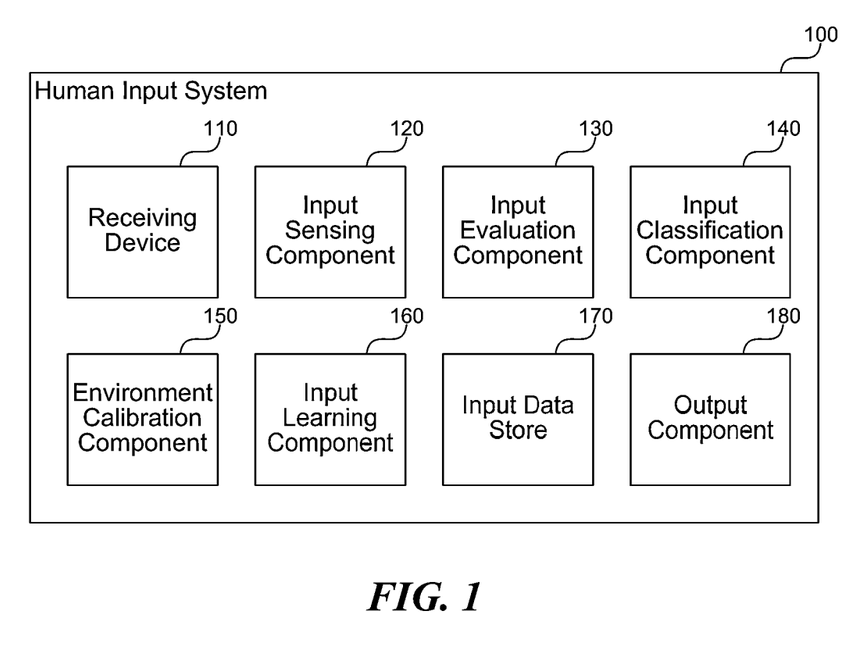
FIG. 1 is a block diagram that illustrates components of the human input system, in one embodiment.

FIG. 1 is a block diagram that illustrates components of the human input system, in one embodiment. The system 100 includes a receiving device 110, an input sensing component 120, an input evaluation component 130, an input classification component 140, an environment calibration component 150, an input learning component 160, an input data store 170, and an output component 180. Each of these components is described in further detail herein.

The receiving device 110 is communicatively coupled to a human body and receives electromagnetic signals from the human body. The coupling may be direct, such as a receiver attached to a person's wrist or neck, or indirect, such as a mobile device in the person's pocket that is capable of sensing signals that emanate from the person's body capacitively or through other methods. The receiving device may include an analog-to-digital converter, a tuner, or other signal receiving circuit that captures electromagnetic data using the body as an antenna and provides the data to other circuits in a usable form. The human body interferes with and absorbs a certain amount of electromagnetic radiation present in modern environments, such as a home. The receiving device 110 may also capture ambient radiation from various sources, and monitor how the ambient radiation various due to sources of interference caused by the person (e.g., waving an arm or object in front of a source of radiation).

The input sensing component 120 receives information about the received electromagnetic signal, including an amplitude of the signal over time. For example, the input sensing component 120 may include software that receives a signal from the receiving device 110 and converts the signal into digital data that can be processed by a computing system and software components to perform useful actions based on the signal. The input sensing component 120 may measure frequency, phase, amplitude, and other characteristics of the incoming signal, pre-process the information, and provide information in various processed formats to the other components described herein. The input sensing component 120 may also apply any environmental noise information gathered by the environment calibration component to subtract unwanted information from the incoming signal (e.g., a refrigerator's electromagnetic signature).

The input evaluation component 130 identifies one or more preclassified human inputs based on the received information about the electromagnetic signal. The human inputs may include various body movements and interactions with objects, such as waving a hand, touching a switch, touching wall, and so forth, as well as locations within a building. The system may classify inputs during a learning phase described further with reference to the input learning component 160. After the system is trained to recognize various inputs, the input evaluation component 130 determines whether various incoming signal data matches any inputs classified during the learning phase. The system 100 may store human input profiles that classify inputs according to amplitude, frequency, location, or other signal characteristics and process the incoming signal to match incoming signals with one or more human input profiles. When a signal matches, the user is performing the matching human input.

The input classification component 140 further classifies identified human inputs to identify subcategories of inputs. For example, the component 140 may determine whether a gesture was performed by the user's left hand or right hand, whether the user is standing or sitting, which fingers the user is holding up on a particular hand, and so forth. These classifications may combine with the identified main gesture to indicate optional characteristics or to differentiate similar human inputs. For example, a software program using the system 100 as input may perform various actions when the user raises her left hand, where the actions are distinguished by which fingers the user holds up on the raised hand. Each difference in the user's position creates a different interference pattern with the ambient electromagnetic radiation, which the system 100 can notice to distinguish various user actions. The input classification component 140 may also combine signal input with input from other devices, such as accelerometers.

The environment calibration component 150 samples information about the environment in which the system is used for calibrating the system to improve gesture identification and classification. Each person's home may have different appliances, distances between electromagnetic sources, and so forth. The system may perform a calibration phase that allows the system to establish a baseline picture of the electromagnetic radiation present in the environment. This may include radiation from televisions, microwaves, refrigerators, household wiring, and so forth. The component 150 may ask the user to perform various actions, such as leaving the room to take a sample of the electromagnetic field without the user present, and to turn on and off various appliances, so that the system will not behave differently when the microwave is on, for example.

The input learning component 160 learns one or more human inputs by asking the user to perform the inputs and observing the change in the received electromagnetic signal as the user performs the inputs. In some embodiments, the system 100 connects with a monitor, television, or other display device and walks the user through a training exercise during which the user performs actions to train the system how the electromagnetic field appears during those actions. For example, the system 100 may ask the user to raise each hand, touch a wall, touch a switch, and so forth. In some embodiments, the system may project or display an image on a wall with which the user interacts to perform actions. For example, the system may project an image of a thermostat for operating an air conditioner and ask the user to touch areas representing increasing or decreasing the temperature. During the learning phase the input learning component 160 captures information about the electromagnetic signal and stores the information in the input data store 170 for use during normal operation of the system 100 to recognize human inputs.

The input data store 170 stores profiles describing electromagnetic changes related to one or more classified gestures. The data store 170 may include one or more in-memory data structures, files, database records, cloud-based storage services, or other facilities for storing data. The system 100 may include one or more predetermined gestures provided by a product manufacturer using the system 100 and may learn one or more gestures from the user. The system stores profiles for each of these types of gestures in the input data store 170 and compares incoming signal information to the stored profiles to determine when a recognized gesture is occurring.

The output component 180 provides information describing identified human inputs to one or more software applications. The system may provide an application programming interface (API) through which applications can register for and receive notifications as human inputs occur. Like touch input today, the system may pre-process incoming human input data to provide applications with one or more logical objects that inform the application about human inputs that have occurred. For example, the component 180 may identify touch points (e.g., fingers), one or more environmental locations touched (e.g., a wall or switch), a location of the user within a building or other structure, and so on and provide information about these to the application so that the application can react to a known set of human inputs without being involved of the raw processing of the electromagnetic signals. In some embodiments, an application may enumerate specific human inputs that the application is interested in (e.g., turning a switch on, rotating a shape, and so on), so that the output component 180 can provide notification as those human inputs occur.

The computing device on which the human input system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
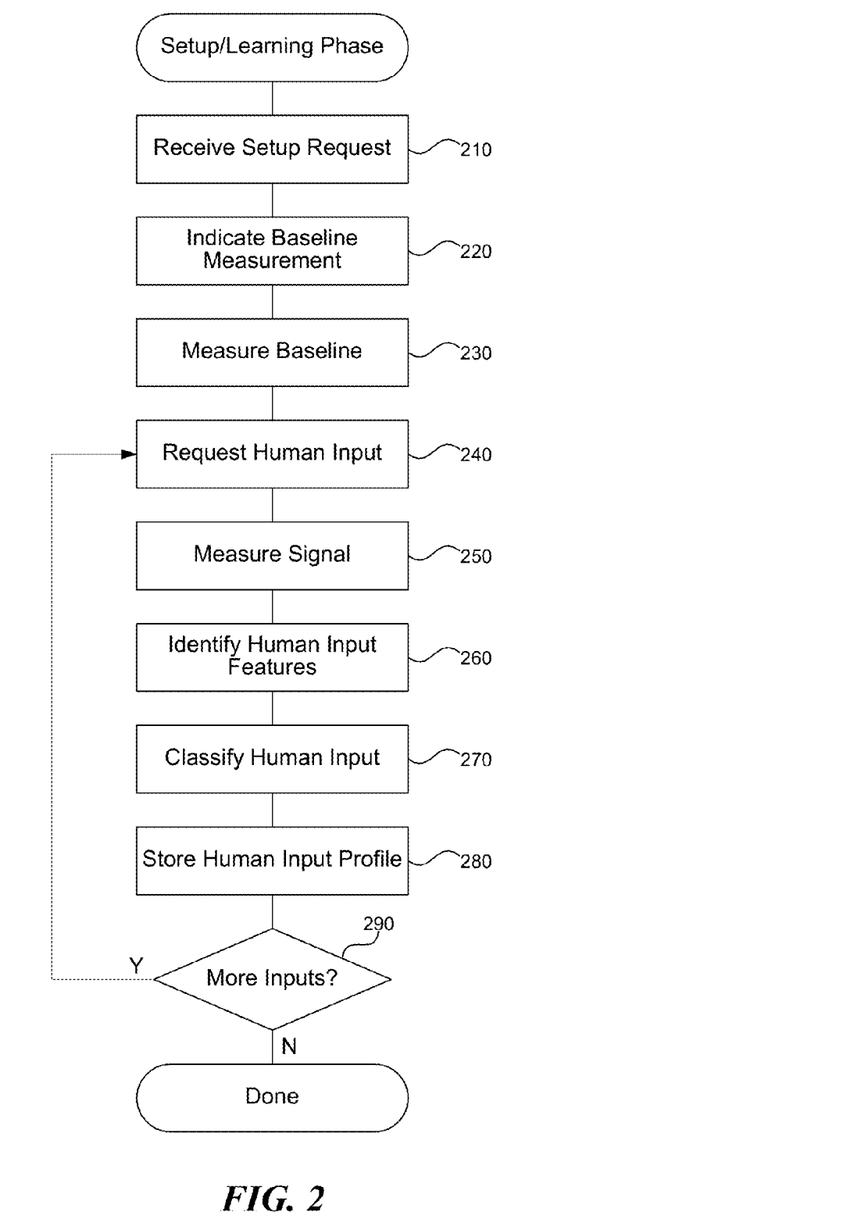
FIG. 2 is a flow diagram that illustrates processing of the human input system to learn information describing an environment and one or more human inputs, in one embodiment.

FIG. 2 is a flow diagram that illustrates processing of the human input system to learn information describing an environment and one or more human inputs, in one embodiment. Beginning in block 210, the system receives a request to setup a human input device that uses the human body as an antenna for sensing electromagnetic fluctuations produced by gestures or other movements made by a person. For example, the users may request a setup function of the device through software or a hardware button on the device. The system may walk the user through the setup phase upon first use or upon detecting a different environment to allow the user to calibrate the device for use to get improved human input recognition results.

Continuing in block 220, the system indicates to the users that a baseline measurement will be performed to capture background electromagnetic information about an environment in which the device is being used. The system may display information to the user requesting various actions of the user to achieve the baseline signal. For example, the system may request that the user stand in a particular neutral position while the system measures the baseline data. Continuing in block 230, the system measures baseline electromagnetic information during a period where the user is not performing a designated human input to compare to electromagnetic information during a period that the user is performing a human input. The system may capture signals coming from household wiring, appliances, and other devices to get a picture or profile of the ambient electromagnetic signal when no human input is occurring. Gestures and other movements or locations of the user will interfere with this signal in various measurable ways, and by comparing later signals with the baseline signal the system can identify gestures, the user's location, and other qualities.

Continuing in block 240, the system requests that the user perform a particular human input. For example, the system may ask the user to hold up an arm, touch a wall, point a finger, and so forth. The user's movement and final position will change the electromagnetic signal in measurable ways so that the system can determine what actions the user is performing. For example, a user's raised arm may block or absorb a dominant electromagnetic field emanating from a refrigerator, while touching a switch may more closely connect the user with a field coming from the household wiring.

Continuing in block 250, the system measures information about the electromagnetic signal while the user is performing the requested human input. The system may store information about the period before and during a particular input. For example, information about a user's movement may be as relevant for some inputs as information about the user's final position. A gesture may involve the user moving in a certain way or performing a certain motion. Any type of gesture, location, or movement can be defined by the system, the user, or an application program for a particular purpose. The system captures information about the signal such as amplitude, frequency, phase, and other information, and compares the information to the measured baseline to identify any differences.

Continuing in block 260, the system identifies electromagnetic features of the human input by comparing the measured information while the user is performing the human input with the measured baseline. For example, the user's movement may change the phase of a signal, absorb or dampen certain frequencies, decrease the amplitude, and so forth. Each of these changes forms a profile that the system uses to recognize the human input when it occurs. Continuing in block 270, the system classifies the human input to identify any subcategories of movement performed by the user. For example, when the system detects a raised arm, the system may classify which arm is raised, how fingers are positioned while the arm is raised, and other nuances that the user or application may intend to represent more subtle human inputs. The system may also classify the user's location, such as a particular room within a building or standing near a known object.

Continuing in block 280, the system stores a human input profile that describes identifiable electromagnetic characteristics of the human input. For example, the system may store any phase, frequency, or amplitude changes and location information associated with the human input. The system may also store the raw received electromagnetic signal for comparison to later received electromagnetic signals to identify the human input. Continuing in decision block 290, if the system has more human inputs to learn, then the system loops to block 240 to receive the next human input else the system completes. The system may walk the user through a predetermined set of human inputs that the system is programmed to learn or the user may train the system to recognize human inputs that are useful to the user for performing particular actions. After block 290, these steps conclude.

Figure 3:
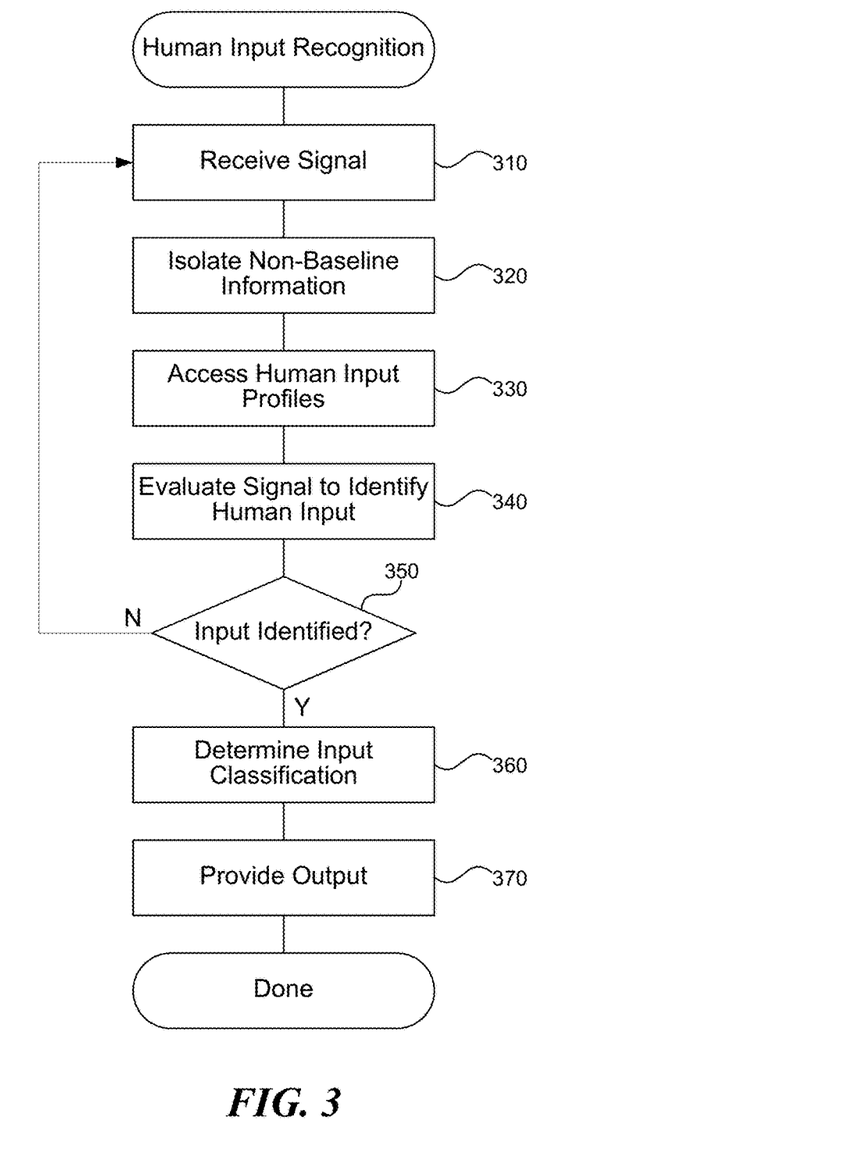
FIG. 3 is a flow diagram that illustrates processing of the human input system to recognize one or more preclassified human inputs being performed by a user of the system, in one embodiment.

FIG. 3 is a flow diagram that illustrates processing of the human input system to recognize one or more preclassified human inputs being performed by a user of the system, in one embodiment. Beginning in block 310, the system receives electromagnetic signal information from a hardware receiving device coupled to a human user acting as an antenna for the receiving device. The user's body absorbs, reflects, and interferes with ambient electromagnetic radiation in ways that the receiving device can measure and provide to software for processing to recognize gestures. The system may capture amplitude, frequency, phase, and other information related to the received signal that can be used to distinguish signals that occur during various user actions.

Continuing in block 320, the system isolates information in the signal that is not related to a previously obtained baseline measurement of non-input ambient electromagnetic radiation in an environment where the human user is located. The system may perform a setup phase like that described with reference to FIG. 2 and store the baseline measurement for comparison to subsequent measurements. The environment in which the system is used is rich with electromagnetic noise, and the system leverages that noise to detect user actions. However, the system also determines the difference between a base state of the noise represented by the baseline measurement and a state of the noise when the user is performing a human input.

Continuing in block 330, the system accesses one or more human input profiles that store information for identifying one or more human inputs based on received electromagnetic signals. The profiles may store changes in amplitude, frequency, or phase that coincide with particular human inputs, the location of the input, as well as a signal "fingerprint" that represents a waveform of the measured signal during a period when the gesture is occurring. The system may compare a signal stored in the profile with the currently received signal to determine whether the current signal matches the profile. If the signals match, then the user is likely performing the human input associated with the profile.

Continuing in block 340, the system evaluates the received signal against the accessed human input profiles to identify one or more human inputs that the user is performing. For example, the system may observe that the received signal matches or is similar enough to a signal received during a learning phase performed by the system to declare that a gesture is being performed. The system may determine a threshold of certainty in the match and may compare the determined threshold to a configurable limit for determining a human input match. The system may allow the user or an application to configure the limit to avoid false positives and increase recognition accuracy or leniency. Continuing in decision block 350, if the system identified a human input, then the system continues at block 360, else the system loops to block 310 to continue receiving signals until a human input is identified.

Continuing in block 360, the system classifies the received human input to identify any sub-gestures present with the human input. For example, a base input may include the user touching a wall while sub-gestures may include determining with how many fingers the user is touching the wall. The classification is a finer level of granularity over the detected human input that allows the system to identify nuances of the user's action. The system may map different human input classifications to different application options, so that when a user performs one action the application behaves differently than when the user performs a close but different action.

In some embodiments, the classification segments detected human inputs to identify a beginning and end of each input. Human inputs may include simple movements or complex series of movements, as well as locations where the movements are performed. The more complex the movement, the more relevant segmentation becomes to determine whether the user is at the beginning of a human input, in the middle, or has just completed a human input.

Continuing in block 370, the system provides information describing the identified human input to an application that receives human input for performing one or more application actions. For example, a drawing application may allow a user to sketch out drawings on a blank wall of the user's house, detecting and interpreting the user's strokes as artistic strokes, as well as other human inputs that may modify the brush, color, or other options available within the drawing program. In this way, the user can interact with the application through body movements and touching the environment around the user. After block 370, these steps conclude.

In some embodiments, the human input system operates without contact to the user's body. For example, the system may measure interference of the user's body with ambient electromagnetic radiation signals or may measure signals picked up by the user's body without direct contact, such as through clothes, through measurement of observable electrical changes, and so forth. Contactless operation may be useful where the user commonly carries a device that can be used to execute the components of the system, such as a mobile phone, article of clothing, or other object carried with the user but not in constant contact with the user's skin. The system may interpret that user's contact with the device as a human input in itself or as a sub-category of another gesture. For example, the system may interpret the user raising an arm with the user's phone in his pocket as one human input, and the user raising his arm with the phone in his hand as another human input. The system can measure the stronger signal produced by direct contact with the user as information for taking various actions.

In some embodiments, the human input system uses measured information about other ambient signals in the environment where the system is being used. For example, the system can use Wi-Fi signals, Bluetooth, heat from light sources, and other information to increase certainty of a detected human input or to detect particular gesture nuances or environmental conditions. The system may behave differently, for example, when the light in a room is on than when it is off. If the light is off and the user raises his hand the system may turn on a fireplace to warm the room while if the light is on and the user raises his hand the system may raise a shade to let in more light. The system may detect these conditions with other sensors such as photocells, heat sensors, and so forth. The system may also combine global positioning system (GPS) or other location information (e.g., Wi-Fi triangulation) to determine the user's location and apply particular human input profiles based on the user's location.

In some embodiments, the human input system differentiates human inputs where a user is touching an object from those where a user is not touching an object. Examples of inputs where the user is touching an object are touching a wall, touching a virtual button, holding a wand, and so forth.

Examples of inputs where a user is not touching an object are those related to a user's posture, such as raising an arm or pointing a finger, as well as those related to motion, such as swinging an arm, jumping, and so on. Human inputs can be either static or dynamic in nature, where static inputs are based on the user's position whereas dynamic inputs are based on the user's motion. Human inputs can also have a location component, where performing an action in one location has a different result than performing the same action in another location.

In some embodiments, the human input system may employ an injected signal that improves measurements. For example, the system may include a separate device that the user plugs into a home outlet that emits electromagnetic radiation in a predictable pattern, perhaps drowning out signals in the environment that are more erratic. The injected signal can also be built into common appliances, such as a game console. The known signal provides the system with a reference against which to measure detected signals to identify human inputs. For some environments, the injected signal may provide a higher fidelity determination of user inputs.

In some embodiments, the human input system captures input speed as an additional data dimension. For example, where an application uses a finger movement to increase the volume of a stereo, a faster movement may indicate a higher volume increase than a slow movement. Most touch interfaces today incorporate the concept of acceleration to adjust scrolling speed, for example. The human input system can capture human input speed and convey that information to applications that receive output from the system so that the applications can perform any application-specific differences based on speed.

In some embodiments, the human input system captures input from multiple person interactions. For example, two users in a room may perform a human input separately or together that the system detects. The system can be used with gaming devices to capture input from multiple users performing game-related activities. Each person in the room interferes with the ambient signals in different ways, and the system can detect what multiple people are doing in similar ways to that described for a single user. The system can do this through separate receiving devices associated with each person or with a single receiving device associated with one person. A device associated with one person will receive a different signal from the other person's actions just by the person's presence in the room or area.

Research Results

The following paragraphs present select data from use of one embodiment of the human input system in several sample settings. This information provides further information about implementation of the system but is not intended to limit the system to those embodiments and circumstances discussed. Those of ordinary skill in the art will recognize various modifications and substitutions that can be made to the system to achieve similar or implementation-specific results.

The research conducted involved an experiment conducted by 10 people in 10 homes validating the operation and robustness of the technique. Results from this experiment show that the system can accurately classify the location in the home where the interaction occurs and the contact positions around light switches and other objects. A set of smaller experiments explore additional capabilities of our approach. Results from these experiments suggest that the system can infer proximity to walls, multi-hand gestures, touched appliances, and continuous position along a touched wall.

A basic receiving antenna can be thought of as an apparatus that converts electromagnetic waves into electrical current. An antenna is made up of a set of conductors that can be arranged in a variety different ways, where the size, geometry, and material dictate its effectiveness at receiving a particular frequency. One of the simplest antennas is just a loop of wire (commonly used for AM and FM radio), whose length determines its effective frequency response. In addition, any wire or conductor carrying current or a wire exposed to an electromagnetic field may exhibit unintentional antenna characteristics. For instance, it is not uncommon to hear AM or CB radio through a set of speakers that is not plugged into a radio. Home electrical wiring also makes an effective antenna, a phenomenon leveraged in this work.

It turns out that the human body is also a very effective antenna over a broad frequency range. The human body is an electrical conductor, and thus when exposed to electromagnetic fields, it behaves as an antenna with a frequency resonance determined by various factors including height, posture, etc. Research suggests that since the human body is a lossy conductor (dielectric) with a complex geometry, it does not have a single effective resonance frequency, but rather a broadly distributed response, capturing frequencies from 40 Hz all the way to 400 MHz Sometimes referred to as the "body antenna effect", this phenomenon poses significant problems for systems employing body area networks (i.e., using the body as a conductor to send data from one part of the body to another) and for systems analyzing electrical phenomena within the body (e.g., muscle activity). Consequently, researchers have gone through great lengths to mitigate the problems of ambient electromagnetic noise being coupled to the body. In contrast, our focus in the present work is to leverage the ambient electromagnetic noise picked up by the human body as a signal for classifying human interaction with the environment.

Related research has focused on using the human body as a conductor for body area networks. For example, in the human-computer interaction (HCI) community, researchers have demonstrated a finger-worn sensor that communicates to a wrist mounted receiver by using the body as an "electric wire". Although their approach did not use the body as an antenna, they noted that touching a surface greatly reduced communication reliability because of the body being grounded and acting as a human antenna. Other work has explored using the human body as a transmission/reception antenna for inter-body communication.

Also in the HCI community, near-field electric field sensing has been a popular approach for touch and motion gestures, where the human body has been used as a disturbance and a radiator of an electric field. Researchers have employed the human body as both a signal conductor and an antenna by passing electromagnetic waves from a conductive pad into the body. These waves are in turn picked up by antennas embedded in a tabletop interaction surface. The present work is interested in picking up noise signals using the body without instrumenting the environment. The system uses the particular properties of the measured noise to infer the gestures performed by the human user. The inventors are not aware of other work that has explicitly looked at using ambient electromagnetic noise picked up by the human body for user interaction.

There are many sources of electromagnetic noise in the environment, but the home power line infrastructure is a major source. A home typically includes electrical wiring that supplies power to outlets, appliances, and lighting via wall switches. The electrical wiring branches from a central circuit breaker, but the ground and neutral wires in the home are all tied together. Thus, signals occurring on the power line in one part of the house can be measured in other parts as well.

In addition, as mentioned earlier, the electrical wiring in the home can act as both a reception and transmission antenna. Past work has used this phenomenon for indoor location tracking, where a tracking signal is radiated off the power line. Similarly, the power line has been used as a large antenna for receiving data wirelessly from ultra-low-power sensor nodes. All of these approaches use a known signal that is either injected through or received by the power lines. Other work has looked at passively monitoring the power line using a high-frequency sampling of the voltage at a single electrical outlet to infer the activation of appliances and electrical devices in the home based on the appearance of electrical noise from those devices.

The system described herein monitors only the electromagnetic noise radiated off the power lines and received by the human body to determine where in the home the person is located and what type of gesture they are performing.

The AC signal itself is one of the largest sources of electromagnetic noise in the home: this signal typically oscillates at 60 Hz (this experiment was conducted in North America and thus refers to 60 Hz AC power; other parts of the world use 50 Hz). However, appliances and electronic devices attached to the power line also contribute some noise. There are roughly three general classes of electrical noise sources that may be found in a home: resistive loads, inductive loads (such as motors), and loads with solid-state switching (also known as switched-mode power supplies).

Purely resistive loads, such as incandescent lamps or electric stoves, may not create detectable amounts of electrical noise while in operation, although just like a resistor, they can be expected to produce trace amounts of thermal noise at low level. A motor, such as in a fan or a blender, is modeled as both a resistive and an inductive load. The continuous breaking and connecting by the motor brushes creates a voltage noise synchronous to the AC power at 60 Hz (and at 120 Hz). Solid-state switching devices, such as those found in computer power supplies, compact fluorescent light (CFL) bulbs, modern TVs, TRIAC dimmer switches, and microwave ovens, emit noise that varies among devices, the frequency of which is determined by an internal oscillator.

The drive towards smaller and more efficient consumer electronics has made use of switched-mode power supplies (SMPS) increasingly prevalent. In a modern SMPS, this modulation happens at a very high rate (10 kHz-1 MHz). A side effect of an SMPS's operation is that the modulation of the inductor's magnetic field produces large amounts of unintentional electromagnetic interference (EMI) centered at or near the modulation frequency. Due to the physical contact between the power line and the power supply, this EMI is coupled onto the power line, which then propagates the noise throughout the entire electrical infrastructure of a home. This is known as conducted EMI, which in turn is radiated by the power line as radiated EMI. The appliance or device itself can also exhibit radiated EMI. Because such EMI may cause problems in the operation of certain electronic devices, the US Federal Communications Commission (FCC) sets rules for any device that connects to the power line and limits the amount of EMI it can conduct. However, despite these limits, significant and detectable EMI is still coupled back over the power line.

There are also several significant sources of electrical noise on the power line that originate outside the home. Radio broadcasts, including commercial AM and FM radio, are picked up by the power line, which acts as a receiving antenna over a wide range of frequencies. In addition, noise from elsewhere in the neighborhood is often coupled through the earth ground connection as well. Pilot tests showed that even after turning off the main power coming into a home, there was still significant baseline noise present in the home, and radiated from the power line.

Past work in power line noise analysis and using the human body as an antenna has largely explored disparate applications. Recognizing the potential of using electrical noise as a signal and the human body as a receiving antenna, this work seeks to enable new user interaction capabilities in the home that involve no additional instrumentation to the environment, and only a simple analog-to-digital converter on the body itself. Based on the prior work, this research hypothesized that the complex shape of the power line infrastructure provides enough spatial differentiability in the signal space to allow us to uniquely identify locations and contact points relative to electrical devices and wiring. In other words, by looking at a various characteristics of the frequencies (presence, amplitude, shape, etc.) observed on body, it is possible to detect gestures.

The present research conducted the experiment in 10 homes selected to represent a variety of constructions, in the United States. These homes were single-family and townhouses built between 1948 and 2006 ($\mu$=1981). They ranged in size between 120 and 290 square meters ($\mu$=215), and had between one and three floors, some of them basements. The owner of each of these homes participated in our experiment. These 10 participants (5 female) were between 28 and 61 years old ($\mu$=38), weighed between 52 and 82 kg ($\mu$=64), and were between 150 and 188 cm tall ($\mu$=169 cm).

Electromagnetic signals radiating from the power lines and picked up by the human body antenna can be measured as voltages. Since the body is relatively conductive, the system can measure these voltages by placing a conductive pad, connected by a wire to an analog-to-digital converter, nearly anywhere on the body. This experiment chose to measure voltages on the back of the neck because it is a stable point on the body that does not move significantly while a person is gesturing with their hands. The neck was also a convenient place because it is near our data collection equipment, which was housed in a backpack worn by the participant.

The device made electrical contact to the skin using a standard grounding strap, typically worn around the wrist when working with sensitive electronics. The experimental apparatus ran a small wire from the contact pad to a National Instruments USB-6216 data acquisition unit, which sampled the voltages at 400 kS/s. The experiment biased the voltage on the contact point to a local ground signal on the data acquisition unit through a 10 M resistor in order to remove most of the DC offset of the single-ended voltage. The signal was digitized at 16-bit resolution and streamed to disk on an attached laptop for subsequent processing.

The experiment selected five light switches and one spot above an electrical outlet on a blank wall for testing in each of the 10 homes. In order to test whether or not we could differentiate between locations in close proximity, we ensured that two of the chosen light switches were located in the same room. The other locations were distributed around the home with at least one location on each floor.

To minimize the number of variables that changed during the experimental session, the experiment turned off appliances to which we had reasonable access and that periodically change their state, including most computers, as well as heating and air conditioning units. The experiment left all light switches used in the experiment on, and did not change the state of any lights or appliances once the experiment started.

Participants stood at arm's length away from the wall and performed six specific gestures around each interaction point (i.e., light switch or wall). The first was a "rest" gesture in which participants placed both hands at their sides. The other five involved contacting the wall with the right palm, placed flat against the wall for six seconds at different positions around the switch. These positions included directly on the light switch plate and at points approximately 20 cm above, below, right of, and left of the light switch. In the case of the blank wall, the same positions were used, but in reference to an arbitrary point at about the height of a light switch above the outlet marked on the wall. Each participant performed these six gestures at all six locations (five switches, one wall) around their home.

To help participants and to ensure consistency, the experiment marked each of the contact points with tape. When obstacles prevented the touch from occurring at 20 cm in any direction from the center position, the experiment placed the tape as close as possible to the target position and noted this. The experiment also taped over the ground screws on each light switch to ensure that the participant would not be shorted to ground while touching the switch. This was done to ensure that each contact with the switch was conducted under the same known conditions. Subsequent experiments confirmed that the ground screw provides a distinguishable signal unto itself that is easy to robustly discriminate from the other positions in our experiment.

Software running on the data collection laptop issued verbal commands in order to guide participants through the experiment. At each location, the software issued commands about which position around the switch for the participant to touch, followed by a two-second beep, allowing the participant time to move to that position. Data was then collected for six seconds before the next command was issued. The experiment randomized the order of the gestures at each light switch to eliminate any potential temporal bias and to ensure that the participant remained cognitively engaged. Participants moved from location to location in a predetermined order, and repeated the entire procedure four times (144 total gestures performed).

One goal of this effort is to inform the development of interactive systems that use the sampled signal to recognize gestures. Hence, the experiment treated the analysis as a machine learning classification problem. Specifically, the experiment used the Sequential Minimal Optimization (SMO) implementation of the support vector machine (SVM) found in the Weka machine-learning toolkit. An SVM uses labeled data to construct a set of hyper-planes that separate labels in a high-dimensional feature space, which can then be used for classification.

In order to prepare data for the SVM, the experiment first segmented the six-second gestures, removing a half-second from the front and end of this period to account for potential reaction time and anticipatory effects. The experiment then divided the raw voltage signal into consecutive 82-millisecond windows. This window size allows for very low latency in gesture detection; however, the results of the classification can be improved by smoothing over longer windows. In these analyses, each of these windows was treated as having independent data points. The experiment then generated the following 1,002 features for each window, which were used to train the SVM.

Figure 4:
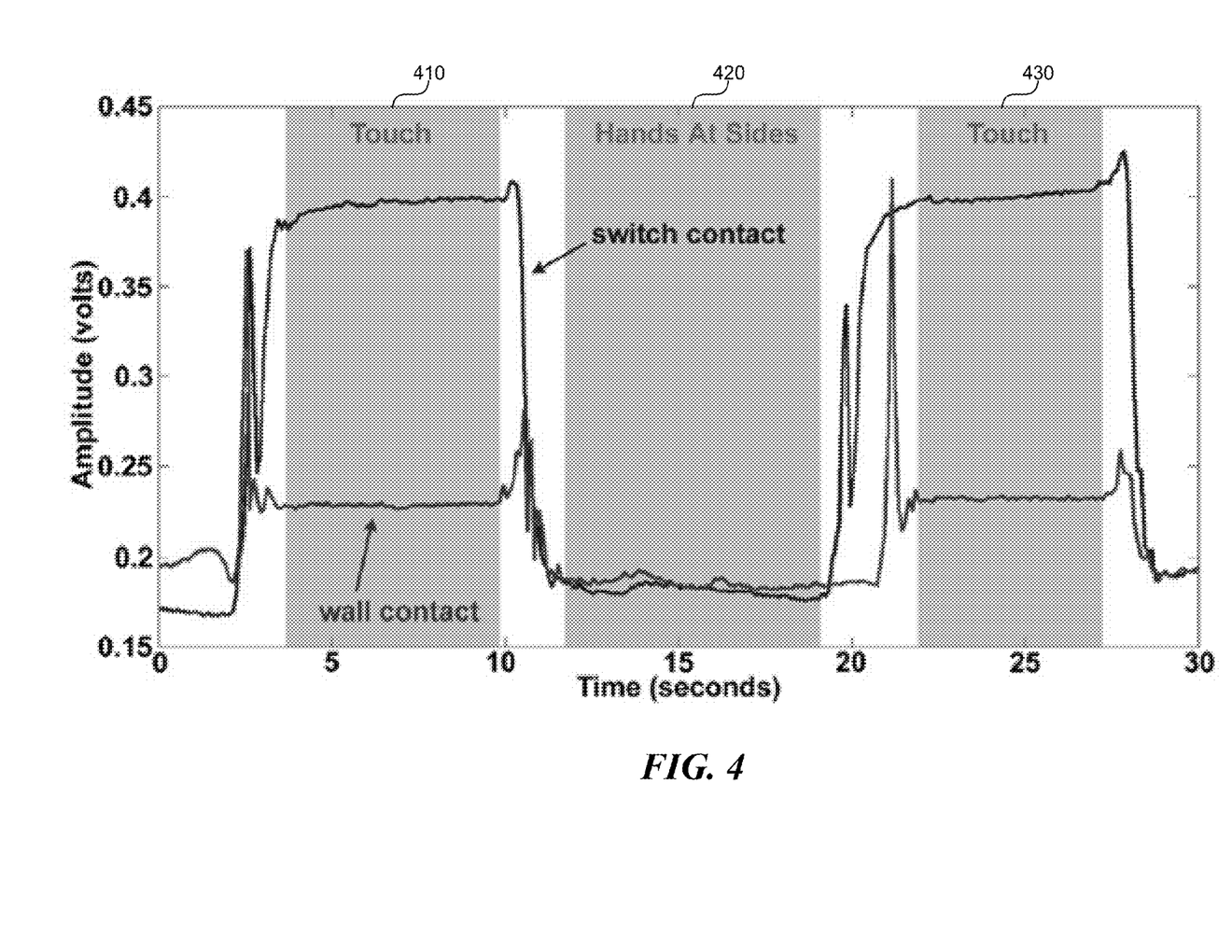
FIG. 4 is a graph that illustrates the time-domain signals from the human input system, in one embodiment.

There were two time domain features. The most basic feature was the mean of the voltage (DC value). The analysis also calculated the root-mean-square, or RMS value. The RMS value represents the AC amplitude of the voltage, which changes significantly between different gestures, as shown in FIG. 4.

There were 582 low-frequency features. Since the power lines are used to carry low-frequency AC power (at 60 Hz), it is not surprising that most of the energy radiated off of the power line and received by the human body antenna is in the low-frequency range. The power spectrum is dominated by 60 Hz and its harmonics. As a result, these frequencies are useful for machine learning. The analysis used all of the raw frequency bins between DC and 2 kHz (12 Hz resolution) produced from a 32768-point FFT as features. Since the SVM is a linear classifier, the analysis included both the linear and log (dB) versions of these features (332 features total). In addition, the harmonics of 60 Hz seem to become negligible at frequencies higher than about 25 kHz, and hence the analysis create a second set of low frequency features containing FFT bins between DC and 25 kHz at 200 Hz resolution, again using both the linear and log(dB) versions (250 features total).

There were 18 high-frequency peak features. Through an initial exploration of the signals received on the human body antenna, it became clear that several high-frequency peaks were indicative of certain types of gestures. As a result, the analysis also includes the maximum value of several of these high-frequency peaks as features. The peaks that were included are 20 k, 30 k, 50 k, 60 k, 80 k, 90 k, 110 k, 140 k, and 150 kHz, again using both the linear and log (dB) versions (18 features total).

There were 400 full frequency range features. In order to encode the general shape of the frequency spectrum, the analysis included features that contain frequency samples between DC and 200 kHz with a 1 kHz resolution, again using both the linear and log (dB) versions (400 features total).

To calculate how accurately the system could classify various conditions, the experiment conducted multiple four-fold cross-validations. Each fold was made up of data points from a single "round" through all locations in the home. This ensured that training and testing data points were separated within a fold, and that training data and testing data were separated by several minutes in time (to avoid over-fitting to transient variations in the environment). These numbers are representative of what one would expect to see in an interactive system. Average accuracies and standard deviations are reported herein.

FIG. 4 is a graph that illustrates the time-domain signals from the human input system, in one embodiment. Looking only at the time-domain signals, it is easy to see the difference between the times 410 and 430 when the participant is touching the wall and the time 420 when they are not. Therefore, not surprisingly, the classification results for this kind of analysis were quite high.

Two-class classification of wall-touch vs. no-wall-touch performed at 98.5%, $\sigma=4.1$ (chance=50%) when averaged across the participants in all 10 homes. Since the strength of the signal received on the body is related to the proximity to the radiating source, in this case the power lines, the experimenters expected that the wall touch classification would perform better on light switches than on the blank walls above outlets. However, the results show that the classification worked just as well on the blank walls, indicating that gestures do not need to be confined to the area around light switches. In fact, touches on most walls are detectable because of the wiring elsewhere in the wall.

The six-location classification of interaction location in the home performed at 99.1%, $\sigma=1.3$ (chance=16.7%) when using data from all gestures around each light switch in each home. This is a very impressive result, made even more impressive by noting that by experimental design, two of the walls in each classification were located in the same room. This suggests the possibility to classify which wall in the home a user is interacting with, rather than just which room.

Perhaps even more interestingly, the same level of accuracy can be obtained without even touching the wall. Using only the data from when the participant was standing at rest at arm's length from the wall (hands at sides), the six-location classification performed at 99.5% $\sigma=1.2$ (chance=16.7%). This is a promising result, because it hints at the possibility of determining the location of people throughout the home, even when they are not interacting directly with the walls. This could enable location-aware systems that use in-air gestures in addition to on-wall gestures.

The five-position classification of gesture position around the light switches performed at 87.4%, $\sigma=10.9\%$ (chance=20%). The touch position on the blank walls can also be classified at 74.3%, $\sigma=16.1\%$ (chance=20%). This is an interesting result, as it suggests that it may be possible to classify arbitrary touch positions on blank walls, not just touches that are near light switches as described further below.

By combining the classification of both the location in home and the touch position on the wall, there is a 30-class problem, which performed at 79.8%, $\sigma=7.0$ (chance=3.3%). While this number may not seem high, recall that these are unoptimized classifications on individual windows and that these numbers will likely increase for entire touches, even simply using naive voting schemes across multiple windows. With no additional instrumentation to the home, these results are quite promising in terms of the ability to both classify touch locations in the home as well as the absolution position on the wall.

Based on the classification results, the system can determine the location of the user in the home, with near 100% accuracy, and can determine whether the user is touching a wall or not with 98% accuracy. With 87% accuracy, we are able to determine the position around a light switch on a wall. The system can even identify both the location in the home and the position on the wall of a given touch with 80% accuracy.

Our core experiments, described above, confirmed our hypothesis that electromagnetic noise in the home is distinguishable at specific locations, allowing discrimination of locations within the home and touched wall positions. In order to guide future work and understand the boundaries of this approach, the experimenters conducted a series of additional experiments to determine other capabilities that our approach might offer. The experimenters also wanted to confirm that decisions we made for consistency in experimental design (e.g., choosing the neck as the body contact location) are not limiting restrictions to our approach.

The experimenters used the data acquisition system and methodology presented in the previous sections, but the following experiments were performed by two participants (instead of 10), each in one (different) home. This reduced participant pool allowed exploring a variety of techniques, while still ensuring that results were not limited to a single person or home. Unless otherwise indicated, classification results are based on the same SVM described above, classifying 82-millisecond windows within five-second gestures, with four-fold cross-validation across four "rounds" through all gestures in an experiment.

The core experiment placed the contact pad on the participant's neck, which allowed eliminating movement of the pad for the sake of experimental consistency. However, for real-world scenarios, connecting a computing device to a user's skin would much more likely sit near a location on which users already wear computing devices (e.g., the wrist). The follow up experiment thus repeated the core five-position classification experiment around a single light switch in each of two homes, with the contact pad placed on the participant's forearm, instead of the neck. The five-position classification of position around the switch performed at 98% and 97% (chance=20%) for our participants. This indicates that the approach performs well with the contact pad placed on the arm (where it might be connected to a watch), which is more practical for consumer scenarios.

Home appliances are known to emit a significant amount of electromagnetic noise. In addition, they have large sections of metal that are well grounded to the home's power line infrastructure. The experimenters hypothesized that this would allow the system to robustly classify contact between a user and a home appliance, suggesting a variety of interaction techniques based on touching uninstrumented appliances. In order to address this hypothesis, participants touched each of six appliances in the same kitchen: refrigerator, freezer, stove, microwave, dishwasher, and faucet. All appliances were plugged in, but not actively running, during the experiment.

Consistent with the hypothesis, the measured electromagnetic noise while touching these appliances was quite dramatic, even compared to the noise observed during wall touches, and showed strong differences in our feature space among appliances. Consequently, classification among these six appliances was 100% for both participants (chance=16.7%). This indicates that direct contact with appliances provides a robust signal for classification, suggesting the potential to turn uninstrumented appliances into real-world "buttons".

In the experiments presented in the previous section, participants used only their right hand. The research hypothesized that asymmetries in body conductivity, subtle asymmetries in contact pad placement, and differences in contact area would allow us to robustly discriminate left, right, and two-handed contact with a wall or light switch. As a preliminary investigation of this hypothesis, participants made left, right, or two-handed contact with a single light switch, and the system attempted to classify among these contact types. Consistent with the hypothesis, dramatic differences in acquired signal were visible among these states, resulting in classification accuracies of 96% and 99% for our two participants (chance=33.3%). This indicates that the approach allows robust discrimination among left, right, and two-handed contact.

Based on initial observations that the amplitude of the signal received on the human body antenna changes continuously as participants' hands approached the wall prior to a touch, the research hypothesized that the captured signal would provide a robust indication of the distance between a person's hand and the wall when no touch is occurring. To investigate this hypothesis, participants rested their right hands above a measuring device for several seconds at five, 10, 15, 20, 25, and 30 cm away from a light switch (along a line perpendicular to the wall). The participant's body did not move throughout this experiment, only the hand.

The follow up experiment used the same features as in our core experiment, and the same cross-validation procedure, but within each fold, rather than training a support vector machine classifier (which discriminates among discrete states), the experiment trained a regression of the features onto the user's distance to the wall, using Weka's implementation of the SMO regression algorithm, which uses a support vector machine to map features into a high-dimensional space (as in an SVM classifier) and performs a linear regression in that space. The overall RMS error was 4.1 cm. This indicates that our approach provides an indication of a user's distance from a wall containing electrical wires, with a resolution on of approximately several centimeters.

The success of the "blank wall" experiment described above suggested that noise radiated from the power lines would vary continuously and predictably along a wall, offering the possibility of continuous touch localization. To assess this hypothesis, the experiment again used a regression approach. In this case, participants rested their right-hand index finger against a wall at distances from 10 cm to 60 cm away from a light switch, along the wall, in one horizontal direction, at 10 cm increments (i.e., 10, 20, 30, 40, 50, and 60 cm). The overall RMS error was 8.1 cm. This indicates that our approach provides an indication of a user's position along a noise-radiating wall, with a resolution of approximately several centimeters.

Our core experiments focused on light switches that were on (i.e., passing current). The noise environment at a light switch, however, is a function of the complete wiring pattern in the wall and the house, suggesting that passing current through the light switch at the center of interaction may not be needed. The experiment thus repeated the five-position classification experiment around a single light switch in each of two homes, with the contact switch off. Classification performed at 99% and 97% (chance=20%) for our two participants. This indicates that our approach performs well even for determining position relative to a light switch that is off.

The ability to discriminate among one- and two-handed contact suggested that changes in contact area would be reflected in our signal, and that it might be possible to discriminate finer changes in contact area, such as the difference between single-finger and multi-finger contact with the wall. To assess this hypothesis, our two participants conducted five-second touches on a light switch using one, two, three, four, and five fingers on a single hand. Classification performed at 53% and 59% (chance=20%). This is significantly lower than classification performance for the other capabilities explored in this section, but indicates that there is a relationship between contact area and our signal features.

The core experiment determined that by measuring the electromagnetic noise received by the human body antenna, the system could classify a person's location in the home with nearly 100% accuracy, and the position that a person is touching around a light switch with 87% accuracy on average. Additional explorations demonstrated the ability to differentiate right and left hands, and determine which appliance is being touched. In addition, the experiments have shown the ability to estimate the distance between a wall and a hand in the air, as well as the position of a hand along a wall.

These are promising results, which support an interactive real-time system for gesture sensing in uninstrumented homes. However, note that all of the classification accuracies reported in this work are on 82-millisecond windows. In an interactive system, it would be more natural to classify at the level of individual touches, which will improve classification performance, since smoothing can be performed over multiple windows.

The ability to turn almost any wall surface or electrical device in the home into an interactive input system enables a breadth of applications. In the light switch scenario, one can imagine mapping a collection of gestures to digital lighting in a room without having to add additional physical switches to the space. Since the system is able to identify the location of the gesture, the interaction can be mapped to specific parts of the home. This enables having arbitrary widgets being placed in the environment. Another application is a simple gesture that can be used to control the home's thermostat from anywhere in the house. For instance, tapping on the wall above and below any light switch could be mapped to increasing and decreasing the thermostat temperature. Similarly, these gestures could be mapped to controlling the music playing through the intercom or whole-home audio system.

In addition, the wearable computing unit has the side effect of identifying the user performing the gesture. Thus, each person in a home could have their own device and can create custom gestures and map them to their own applications. The ability to scale the entire home into an input system also enables a breadth of new gaming and general computing applications that could easily be deployed in any home. Exploring and building these applications remains future work.

System testing has demonstrated the feasibility of a new interaction modality that utilizes the human body as a receiving antenna for ambient electromagnetic noise already in existence in our environments. While this noise poses problems for many sensing applications, the system uses this phenomenon as its signal, thereby reducing the need to instrument the environment. By examining the noise picked up by the body, this research has shown that the system can infer the absolute touch position around a light switch or blank wall near electrical wiring within the home with nearly 87% accuracy. The location of which wall in the home a person is touching has nearly 100% classification accuracy. The research also demonstrated the potential for hovering and continuously tracking a hand on a wall to enable a richer set of interaction techniques. Interacting with electrical devices and appliances also produces discernable changes in the received signal that could provide additional opportunities for further exploration. Although our initial experiments were conducted with rather bulky test equipment, this sensing modality only involves a wearable contact pad and an analog-to-digital converter, suggesting incorporation into an easy-to-deploy form factor such as a watch or mobile phone.

From the foregoing, it will be appreciated that specific embodiments of the human input system have been described herein for purposes of illustration, but that various modifications may be made without deviating from the spirit and scope of the invention. Accordingly, the invention is not limited except as by the appended claims.

We claim:
1. A computer-implemented method for learning information describing an environment and one or more human inputs in a human input system, the method comprising:
   receiving a request to setup a human input device that uses the human body as an antenna for sensing electromagnetic fluctuations produced by human inputs made by a user;
   building a model that can use electromagnetic information during a period that the user is performing a human input to infer the human input;
   requesting that the user perform a particular human input;
   measuring information describing the electromagnetic signal while the user is performing the requested human input;
   identifying electromagnetic features of the human input by comparing the measured information while the user is performing the human input with the model; and
   storing a human input profile that describes identifiable electromagnetic characteristics of the human input,
   wherein the preceding steps are performed by at least one processor.

2. The method of claim 1 wherein receiving the setup request comprises detecting a first use of the system and walking the user through a setup phase to allow the user to calibrate the system to produce more accurate human input recognition results.

3. The method of claim 1, further comprising indicating to the user that a baseline measurement will be performed to capture background electromagnetic information.

4. The method of claim 3, further comprising measuring baseline electromagnetic information during a period where the user is not performing a designated human input.

5. The method of claim 4, wherein measuring baseline electromagnetic information comprises capturing signals coming from devices in the background to get a profile of ambient electromagnetic signals.

6. The method of claim 3, wherein indicating to the user that a baseline measurement will be performed to capture background electromagnetic information comprises displaying information to the user requesting that the user stand in a particular neutral position while the baseline measurement is being performed.

7. The method of claim 1 wherein identifying electromagnetic features of the human input comprises determining a location of the user in an environment.

8. The method of claim 1 wherein measuring information during the human input comprises storing information received from a period before and during a human input.

9. The method of claim 1 wherein measuring information during the human input comprises measuring static information produced by the user's posture.

10. The method of claim 1 wherein measuring information during the human input comprises measuring dynamic information produced by the user's movement.

11. The method of claim 1 wherein measuring information during the human input comprises measuring amplitude, frequency, and phase of the signal.

12. The method of claim 1 wherein identifying electromagnetic features comprises determining that the user's movement changed a phase of the signal, absorbed or dampened certain frequencies, or modified an amplitude of the signal, wherein the changes form a profile that the system uses to recognize the human input as it occurs.

13. The method of claim 1 wherein storing the human input profile comprises storing any phase, frequency, or amplitude changes associated with the human input, a location of the user during the human input, and a raw received electromagnetic signal for comparison to later received electromagnetic signals to identify the human input.

14. A computer system for sensing human inputs as a person's body interferes with one or more signals, the system comprising:
a receiving device near a human body that receives electromagnetic signals interfered with by the human body;
a memory that stores one or more profiles describing electromagnetic changes related to one or more classified human inputs; and
a processor coupled to the memory and configured to execute software instructions, the processor comprising:
an input sensing component that receives information describing the received electromagnetic signal, including an amplitude of the signal over time;
an input evaluation component that identifies one or more preclassified human inputs based on the received information describing the electromagnetic signal;
an environment calibration component that samples information about an environment in which the system is used for calibrating the system to improve human input identification, wherein the calibrating comprises performing a baseline measurement to capture background electromagnetic information when no designated human input is being performed to get a profile of ambient electromagnetic signals;
and
an output component that provides information describing identified human input to one or more software applications.

15. The system of claim 14 wherein the receiving device is attached to a person's wrist, neck, or other location on the body.

16. The system of claim 14 wherein the environment calibration component periodically performs a calibration phase that allows the system to establish a baseline picture of the electromagnetic radiation present in the environment.

17. The system of claim 14 further comprising an input learning component that learns one or more human inputs by asking the user to perform the human inputs and observing one or more changes in the received electromagnetic signal as the user performs the human inputs.

18. A computer-readable storage medium comprising instructions for controlling a computer system to recognize one or more preclassified human inputs being performed by a user of the system, wherein the instructions, upon execution, cause a processor to perform actions comprising:
performing a baseline measurement to capture background electromagnetic information when the user is not performing a designated human input to get a profile of ambient electromagnetic signals;
receiving electromagnetic signal information from a hardware receiving device coupled to the user acting as an antenna for the receiving device;
isolating information in the received signal that is not related to the baseline measurement of non-input ambient electromagnetic signals;
accessing one or more human input profiles that store information for identifying one or more human inputs based on received electromagnetic signals;
evaluating the received signal against the accessed human input profiles to identify one or more human inputs that the user is performing;
classifying the received human input to identify segments that indicate where the human input begins and ends in the received signal information; and
providing information describing the identified human input to an application that receives human input for performing one or more application actions.

19. The computer-readable storage medium of claim 18, wherein evaluating the received signal further comprises determining whether the received signal matches a signal received during a learning phase performed by the system.

20. The computer-readable storage medium of claim 18, wherein classifying the received human input further comprises identifying one or more sub-gestures within the received human input.

* * * * *